United States Patent
Clarke

(10) Patent No.: US 6,584,777 B1
(45) Date of Patent: Jul. 1, 2003

(54) APPARATUS FOR AND METHOD OF FILTERING A FLUID

(75) Inventor: Andrew Clarke, Nottingham (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 09/593,078

(22) Filed: Jun. 13, 2000

(30) Foreign Application Priority Data

Jun. 16, 1999 (GB) ............................................. 9913902

(51) Int. Cl.⁷ ............................................. F02C 7/047
(52) U.S. Cl. ........................ 60/776; 60/39.093; 60/736; 210/130; 210/149
(58) Field of Search .................... 60/39.093, 736, 60/226.1, 776; 210/130, 149

(56) References Cited

U.S. PATENT DOCUMENTS

| | | | |
|---|---|---|---|
| 2,670,082 A | * 2/1954 | Dunn et al. | 60/39.093 |
| 2,865,442 A | * 12/1958 | Halford et al. | 210/103 |
| 3,675,772 A | * 7/1972 | Zhukovsky et al. | 210/90 |
| 3,693,347 A | * 9/1972 | Kydd et al. | 60/39.05 |
| 4,041,697 A | * 8/1977 | Coffinberry et al. | 60/39.093 |
| 4,218,194 A | * 8/1980 | Reber et al. | 60/39.02 |
| 4,625,701 A | * 12/1986 | Bartlett et al. | 123/514 |
| 5,124,052 A | * 6/1992 | Hardaker | 210/130 |
| 5,702,592 A | * 12/1997 | Suri et al. | 210/149 |
| 5,881,699 A | 3/1999 | Brown et al. | |

FOREIGN PATENT DOCUMENTS

| | | |
|---|---|---|
| GB | 1 555 736 | 11/1979 |
| GB | 2 053 354 | 2/1981 |

* cited by examiner

*Primary Examiner*—Ted Kim
(74) *Attorney, Agent, or Firm*—Pillsbury Winthrop LLP

(57) ABSTRACT

A fuel system (10) comprises a tank (12), a pump (14), heat exchangers (16 & 18) and a filter (20) in series fluid flow relationship. A fuel metering unit (24) returns a proportion of the filtered fuel to the tank (12) and is controlled by the engine electronic control (30). The system (10) operates so that fluid is not returned to the tank (12) when a pressure differential of the order of 5 psi is detected across the fluid filter (20) and the temperature of the fluid is below 0° C. The fluid is not returned to the tank (12) for a period of time to reduce the flow of fluid passing through the heat exchangers (16 & 18). The reduced flow of fluid passing through the heat exchangers (16 & 18) is heated to a temperature sufficient to melt any solidified impurities blocking the fluid filter (20).

26 Claims, 1 Drawing Sheet

APPARATUS FOR AND METHOD OF FILTERING A FLUID

Figure 1:
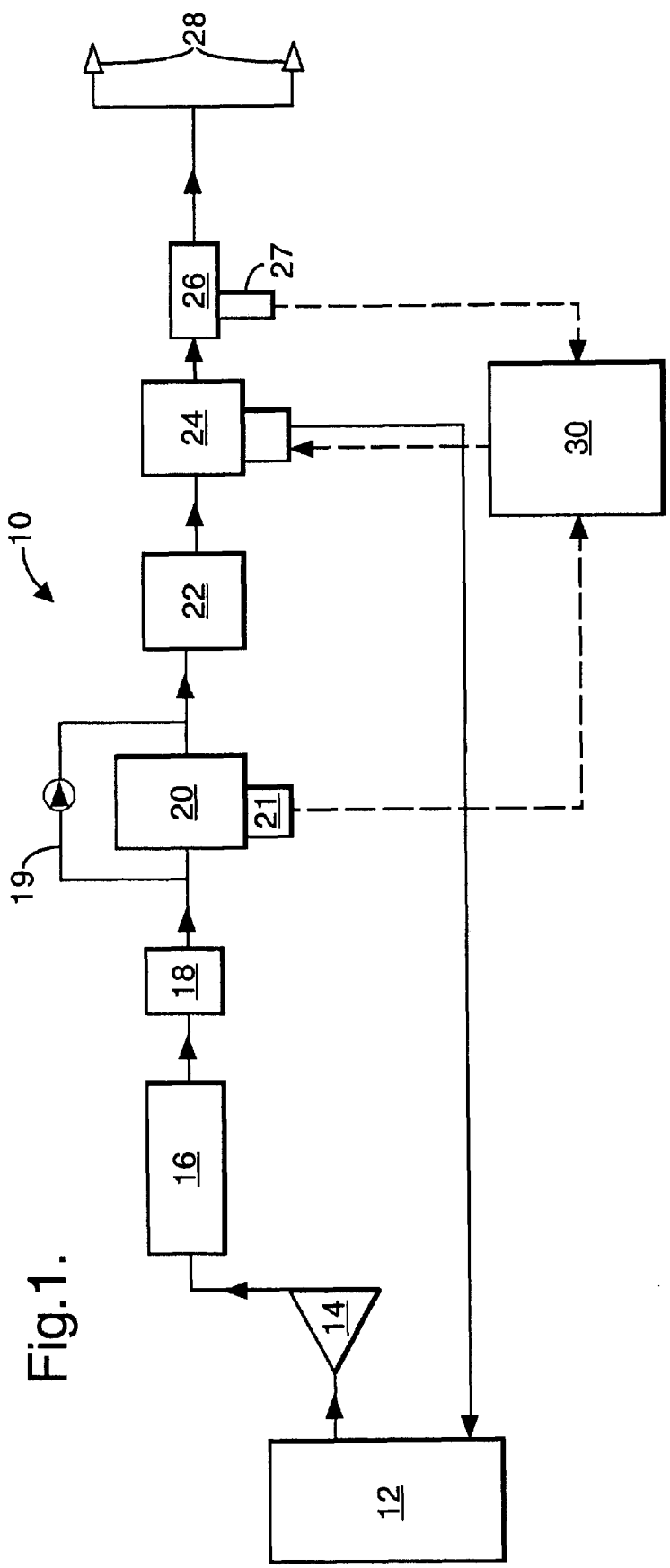

The present invention relates to a fluid filter assembly and to a method of removing impurities entrained within a fluid which solidify to block the filter at low temperatures. In particular the present invention relates to the use of such a fluid filter assembly in the fuel system of a gas turbine engine.

The fuel system of a gas turbine engine functions to provide the engine with fuel in a form and quantity required to suit all engine operating conditions. A fuel pump delivers fuel to spray nozzles which inject the fuel into a combustion chamber in the form of an atomised spray. The fuel is supplied to the spray nozzles via a fuel filter which serves to remove particulate impurities from the fuel. By keeping the fuel free from impurities the possibility of a blockage occurring within the fuel system is reduced.

A heat exchanger is located adjacent the inlet to the fuel filter. The heat exchanger acts to transfer heat from a flow of oil to the fuel thereby cooling the oil. By transferring heat to the fuel liquid impurities entrained within the fuel, such as water, are heated and pass out of the combustion system.

In many gas turbine engines a proportion of the heated fuel is diverted from the engine fuel system and returned to the fuel tanks. The fuel tanks are located in the aircraft wings and the diverted fuel heats the fuel in the tanks to reduce the potential for ice formation on the wing surfaces. When the fuel is diverted to the tanks the additional fuel flow through the engine fuel system reduces the efficiency of the heat exchanger. If the engine fuel temperature is below a critical value the reduction in the temperature rise in the heat exchanger is such that the outlet temperature is below 0° C. and the fuel filter can block with ice. A consequence of this is that eventually the filter becomes totally blocked with ice and a bypass provided around the filter opens exposing the engine to iced fuel. This may lead to eventual malfunction of the engine.

The present invention seeks to provide a fluid filter assembly and method of operating the fluid filter assembly to prevent exposure of the engine to iced fuel.

According to the present invention a fluid filter assembly comprises a fluid tank, a pump, at least one heater and a filter in series fluid flow relationship, means for returning a proportion of the filtered fluid to the fluid tank being provided and incorporating means to control the amount of fluid being returned to the tank, the control means operating to prevent the fluid being returned to the tank when a pressure differential is detected across the fluid filter and the temperature of the fluid is below a predetermined value.

In the preferred embodiment of the present invention the control means operates to prevent the fluid being returned to the tank when a pressure differential of the order of 5 psi is detected across the fluid filter and the temperature of the fluid is below 0° C.

Preferably the control means is a fluid metering unit which may be controlled electronically.

In the preferred embodiment of the present invention a differential pressure switch is attached to the fluid filter to detect the pressure differential across the filter and a temperature sensor detects the temperature of the filtered fluid. The temperature sensor may be a thermocouple.

Two heaters may be provided and the heaters are preferably heat exchangers in which heat is exchanged between two fluids which in operation pass therethrough.

In a further embodiment of the present invention a second pump is located at the outlet to the filter which delivers the fluid at a higher pressure to spray nozzles which inject the fluid into a chamber as an atomised spray.

The fluid filter assembly in accordance with the present invention is suitable for use in the fuel system of a gas turbine engine.

A method of melting solidified impurities blocking a fluid filter in a fluid filter assembly, which comprises a fluid tank, a pump, at least one heater and a filter in series fluid flow relationship, means being provided for returning a proportion of the filtered fluid to the fluid tank and which incorporates means to control the amount of fluid passing therethrough, the method comprising the steps of, operating the control means to allow a proportion of the fluid to be returned to the fluid tank, detecting the pressure differential across the fluid filter and the temperature of the fluid, operating the control means when the pressure differential and the temperature reach a predetermined valve to prevent the fluid returning to the tank, preventing the fluid being returned to the tank for a predetermined period of time to reduce the flow of fluid passing through the heater, heating the reduced flow of fluid passing through the heater to a temperature sufficient to melt any solidified impurities in the fluid filter.

In the preferred embodiment of the present invention the control means operates to prevent the fluid being returned to the tank when a pressure differential of the order of 5 psi is detected across the fluid filter and the temperature of the fluid is below 0° C. The control means operates to prevent the fluid being returned to the tank for a time period of the order of 3 minutes.

The present invention will now be described with reference to the following FIGURE which shows a schematic view of a fluid assembly in accordance with the present invention.

Referring to FIG. 1, a fuel system for a gas turbine engine is generally indicated at 10. The fuel system 10 comprises a fuel pump 14 which delivers fuel from a tank 12, located in the aircraft wings (not shown), to heat exchangers 16 and 18.

In the heat exchangers 16 and 18 the fuel is heated by a flow of oil passing therethrough. The heated fuel then passes from the heat exchanger 18 through a filter 20 to a further pump 22. The pump 22 delivers the fuel at a higher pressure to a fuel metering unit 24 which determines how much fuel is delivered to spray nozzles 28 via a final filter 26.

A proportion of the fuel flow may be diverted by the fuel metering unit 24 back to the tanks 12 in the aircraft wings. The diverted fuel flow acts to heat the fuel in the tanks 12 and reduces the potential for ice formation on the wing surfaces of the aircraft.

When the fuel metering unit 24 operates to divert fuel back to the tanks 12 the additional flow of fuel through heat exchangers 16 and 18 reduces their thermal efficiency. The temperature of the fuel at the outlet of the heat exchangers 16 and 18 falls and the filter 20 starts to block with ice. A differential pressure switch 21 is fitted to the filter 20 and gives a warning of the impending blockage. The switch 21 is set to operate at 5 psi pressure differential and sends a signal, indicated by the dotted line, to the engine electronic control 30. If a fuel temperature thermocouple 27, located on the final filter 26 adjacent the spray nozzles 28, indicates that the temperature of the fuel is below 0° C. the electronic engine control 30 sends a signal to the fuel metering unit 24 to prevent the fuel being returned to the aircraft tank 12.

By preventing the fuel being returned to the aircraft tanks 12 the fuel heating in the heat exchangers 16 and 18 is restored. The fuel temperature at the outlet of the heat exchangers 16 and 18 increases to a positive value and melts the ice in the filter 20. The electronic engine control 30 sends a signal to the fuel metering unit 24 to prevent the fuel returning to the tanks 12 for a period of the order of three minutes. This ensures that the filter 20 is fully de-iced before the warm fuel is diverted back to the tanks 12 in the aircraft wings.

The temperature signal from the thermocouple 27 ensures fuel continues to be returned to the aircraft tanks 12 when the filter 20 starts to block with contaminants other than ice. If the filter 20 is blocked with contaminants other than ice a bypass 19 opens when the pressure differential exceeds 25 psi.

A fuel system in accordance with the present invention offers the advantage that heating of the fuel in the tanks 12 is maintained with only short interruptions. Fuel system icing problems are avoided without providing additional heating and the need for a larger capacity fuel filter is avoided. By restricting the operation of the bypass 19 around the fuel filter 20 to blockage conditions not involving ice the engine is not exposed to iced fuel.

Whilst the present invention has been described with reference to the fuel system of a gas turbine engine it will be appreciated by one skilled in the art that the invention is applicable to any filtering system in which problems are envisaged due to the solidification of liquid impurities entrained within a fluid at low temperatures.

I claim:

1. A fluid filter assembly comprising a fluid tank, a pump, at least one heater and a filter in series fluid flow relationship, a temperature sensor configured and arranged to detect a temperature of the fluid, a pressure sensor configured and arranged to detect a pressure differential across the filter, means for returning a proportion of the filtered fluid to the fluid tank being provided and incorporating means to control the amount of fluid being returned to the tank, the control means operating to prevent the fluid being returned to the tank when a pressure differential is detected across the fluid filter and the temperature of the fluid is below a predetermined value.

2. A fluid filter assembly as claimed in claim 1 in which the control means operates to prevent the fluid being returned to the tank when a pressure differential of the order of 5 psi is detected across the fluid filter and the temperature of the fluid is below 0° C.

3. A fluid filter assembly as claimed in claim 1 in which the control means is a fluid metering unit.

4. A fluid filter assembly as claimed in claim 1 in which the control means is controlled electronically.

5. A fluid filter assembly in claim 1 in which the pressure sensor includes a differential pressure switch.

6. A fluid filter assembly as claimed in claim 1 in which the temperature of the filtered fluid is measured by a thermocouple.

7. A fluid filter assembly as claimed in claim 1 in which two heaters are provided.

8. A fluid filter assembly as claimed in claim 1 in which the heater is a heat exchanger in which heat is exchanged between two fluids which in operation pass therethrough.

9. A fluid filter assembly as claimed in claim 1 in which a second pump is located at the outlet to the filter which delivers the fluid at a higher pressure to spray nozzles which inject the fluid into a chamber as an atomised spray.

10. A fluid filter assembly as claimed in claim 1 wherein the fluid is engine fuel and wherein the fluid tank is configured and arranged to hold the engine fuel and to be mounted in the wing of an aircraft.

11. A method of melting solidified impurities blocking a fluid filter in a fluid filter assembly, which comprises a fluid tank, a pump, at least one heater and a filter in series flow relationship, means being provided for returning a proportion of the filtered fluid to the fluid tank and which incorporates means to control the amount of the fluid passing therethrough, the method comprising the steps of, operating the control means to allow a proportion of the fluid to be returned to the fluid tank, detecting the pressure differential across the fluid filter and the temperature of the fluid, operating the control means when the pressure differential and the temperature reach a predetermined value to prevent the fluid returning to the tank, preventing the fluid returning to the tank for a predetermined period of time so that the flow of fluid passing through at least one heater is reduced, heating the reduced flow of fluid passing through at least one heater to a temperature sufficient to melt any solidified impurities in the fluid filter.

12. A method of melting solidified impurities blocking a fluid filter as claimed in claim 11 in which the control means operates to prevent the fluid being returned to the tank when a pressure differential of the order of 5 psi is detected across the fluid filter and the temperature of the fluid is below 0° C.

13. A method of melting solidified impurities blocking a fluid filter as claimed in claim 11 in which the control means operates to prevent the fluid being returned to the tank for a time period of the order of 3 minutes.

14. A fluid filter assembly comprising:
  a tank configured and arranged to hold a fluid;
  a pump configured and arranged to pump the fluid;
  at least one heater configured and arranged to heat the fluid;
  a filter configured and arranged to filter the fluid;
  a temperature sensor configured and arranged to detect a temperature of the fluid;
  a pressure sensor configured and arranged to detect a pressure differential across the filter;
  a conduit and metering unit configured and arranged to return a proportion of the filtered fluid to the tank; and
  a controller configured and arranged to control the proportion of the filtered fluid returned to the tank,
  wherein the fluid tank, the pump, the at least one heater and the filter are connected in a series fluid flow relationship, and
  wherein the controller is further configured and arranged to control the proportion of the filtered fluid returned to the tank based on the detected temperature and the detected pressure differential.

15. The fluid filter assembly according to claim 14, said assembly further comprising a bypass valve configured and arranged to allow fuel to bypass the filter.

16. The fluid filter assembly according to claim 14, wherein the controller is configured and arranged to control the proportion of the filtered fluid returned to the tank based on a relation between the detected pressure differential and a first predetermined pressure threshold, and
  wherein the bypass valve is configured and arranged to allow fuel to bypass the filter based on a relation between the detected pressure differential and a second predetermined pressure threshold, the second predetermined pressure threshold having a greater value than the first predetermined pressure threshold.

17. The fluid filter assembly according to claim 14, wherein the controller receives at least one among the detected pressure differential and the detected temperature as an electronic signal.

18. The fluid filter assembly according to claim 14, wherein the controller receives the detected pressure differential and the detected temperature as electronic signals.

19. The fluid filter assembly according to claim 14, wherein the at least one heater includes a heat exchanger.

20. The fluid filter assembly according to claim 14, said assembly further comprising a second pump configured and arranged to provide at least a portion of the filtered fluid to at least one spray nozzle.

21. A fluid filter assembly comprising:

a fluid tank;

a filter in a downstream fluid flow relationship to the fluid tank;

a temperature sensor to detect a temperature of the fluid;

a pressure sensor to detect a pressure differential across the filter;

a metering unit having a return path to return a proportion of the filtered fluid to the fluid tank;

an ice blockage determining mechanism to signal when the filter is blocked with ice when both a pressure differential is detected across the fluid filter and the temperature of the fluid is below a predetermined value; and a corrective action mechanism to take a corrective action when the ice blockage determining mechanism signals that the filter is blocked with ice.

22. The assembly according to claim 21, wherein said corrective action mechanism comprises a return control mechanism to control the return of fuel via the return path to the fluid tank, said return control mechanism preventing fluid from being returned to the fluid tank when the ice blockage determining mechanism signals that the filter is blocked with ice.

23. The assembly according to claim 22, wherein the fluid is prevented from being returned to the fluid tank for a minimum predetermined period of time.

24. The assembly according to claim 23, wherein the minimum predetermined period of time comprises a period of the order of three minutes.

25. A fluid filter assembly comprising:

a fluid tank;

a filter in a downstream fluid flow relationship to the fluid tank;

a temperature sensor to detect a temperature of the fluid;

a pressure sensor to detect a pressure differential across the filter;

a metering unit having a return path to return a proportion of the filtered fluid to the fluid tank;

a blockage determining mechanism to determine a type of blockage of the filter, the blockage being because of ice blockage when both a pressure differential is detected across the fluid filter and the temperature of the fluid is below a predetermined value, the blockage being for reasons other than ice blockage when the pressure differential is detected and the temperature of the fluid is at a predetermined level above the predetermined value.

26. The assembly according to claim 25, further comprising a bypass around the fuel filter operable when there is a blockage of the filter for reasons other than ice blockage.

* * * * *